March 18, 1969 W. C. JEFFERY ET AL 3,433,509
PIPE COUPLING
Filed Feb. 24, 1966 Sheet 1 of 2
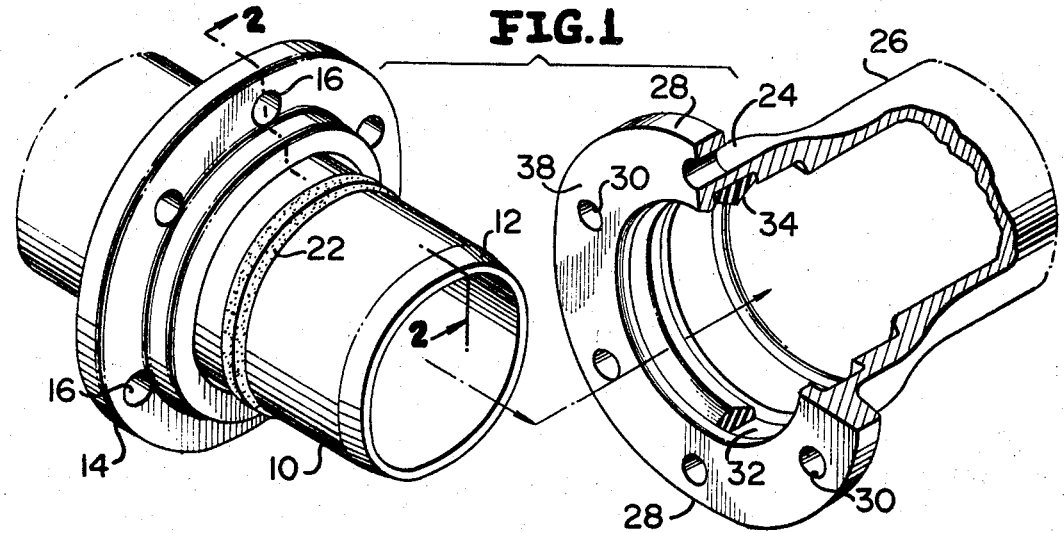
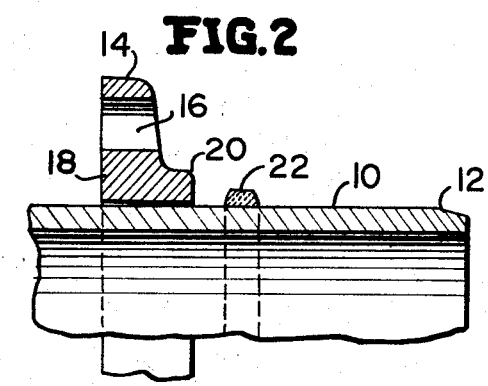
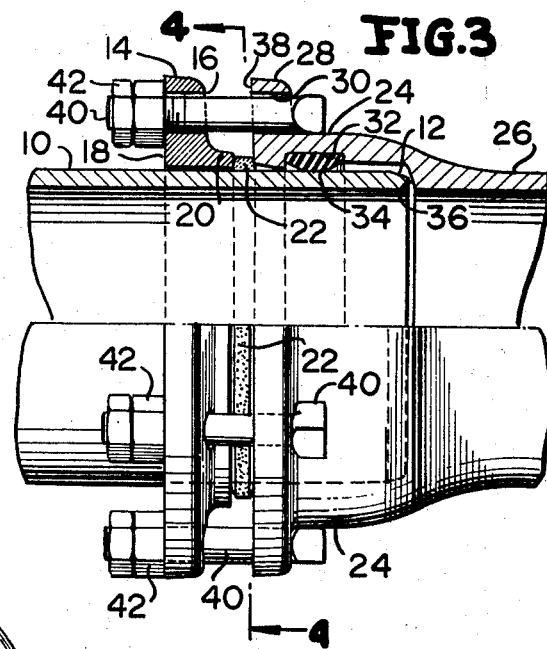
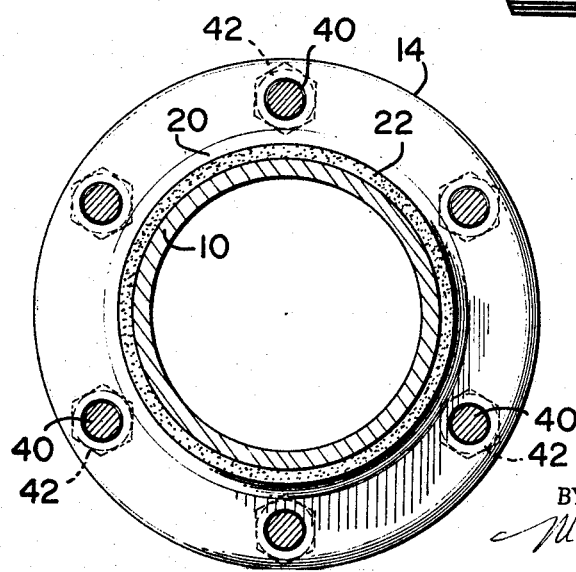
INVENTORS
WARREN C. JEFFERY
& SIDNEY P. TEAGUE
BY *Mason, Porter, Diller & Brown*
ATTORNEYS March 18, 1969 W. C. JEFFERY ET AL 3,433,509
PIPE COUPLING
Filed Feb. 24, 1966 Sheet 2 of 2
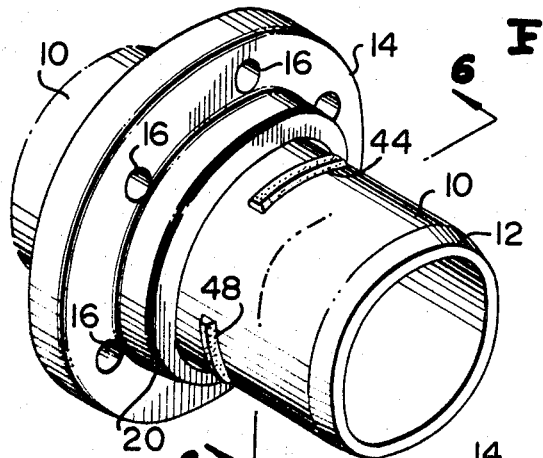
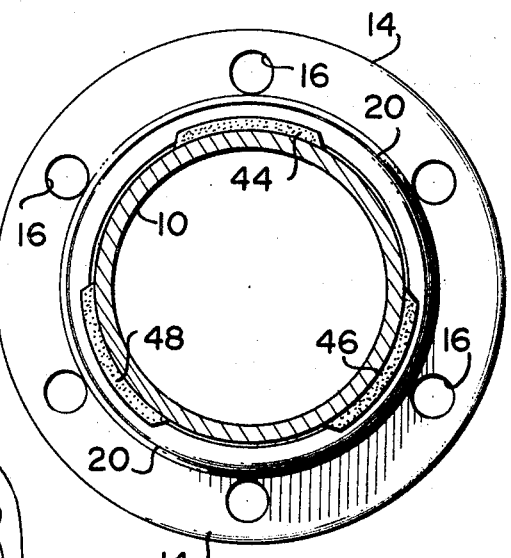
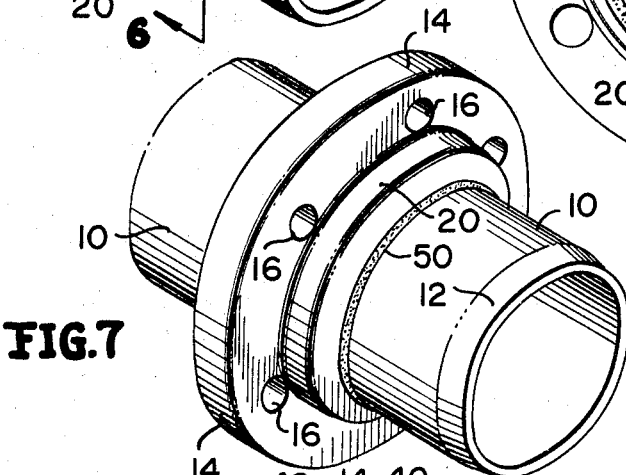
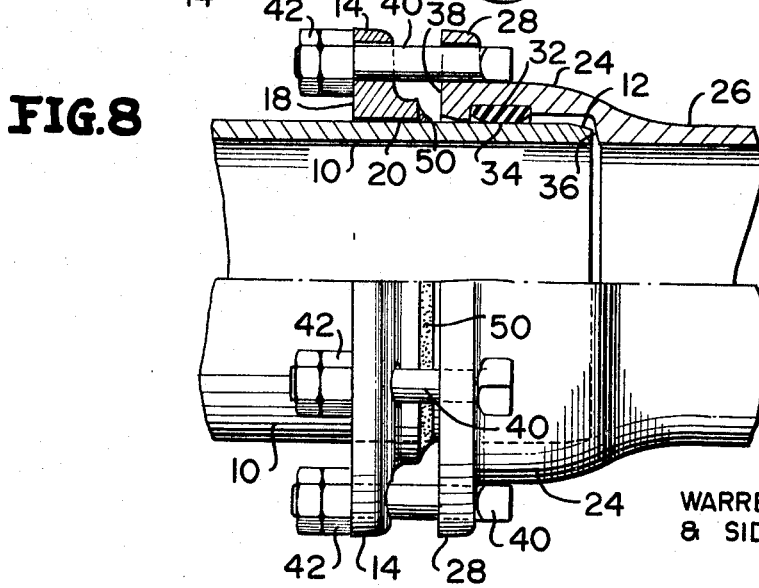
INVENTORS
WARREN C. JEFFERY
& SIDNEY P. TEAGUE
BY
Mason, Porter, Diller & Brown
ATTORNEYS United States Patent Office 3,433,509
Patented Mar. 18, 1969

3,433,509
PIPE COUPLING
Warren C. Jeffery and Sidney P. Teague, Birmingham, Ala., assignors to McWane Cast Iron Pipe Company, Birmingham, Ala., a corporation of Delaware
Filed Feb. 24, 1966, Ser. No. 529,702
U.S. Cl. 285—374                                 10 Claims
Int. Cl. F16l 21/02, 23/00

ABSTRACT OF THE DISCLOSURE

This disclosure relates to a bell and spigot type joint wherein a welded bead on the spigot limits the extent of insertion thereof into the bell, the bead being contacted by an annular flange slidably carried by the spigot and a portion of the bell, and means connecting the annular flange to the bell and maintaining the bell in contact with the bead whereby a downward component of force through the bead created by internal pressure tending to axially separate the bell and spigot automatically counteracts increased internal pressure.

The pipe joint of the present invention is primarily useful in joining sections of pipe of cast iron or of ductile cast iron in the "as cast" condition. That is to say, no machining of the sealing member engagement surfaces is required to effect a high pressure seal. It is known that due to manufacturing processes, the actual size of a section of the pipe varies within certain limits and it is highly desirable that the joint be constructed and form a seal without the necessity of machining.

Prior art

Perhaps the earliest form of joint for cast iron pressure pipe was constructed by threading each end of a substantially similar section of pipe and then positioning a flange over the threaded end. A sealing member or gasket was then positioned between the flanges and the flanges were bolted together. Although this pipe joint formed an effective seal at high operating pressures and was obviously resistant to separation, a number of disadvantages were prevalent in that the assembled joints would not permit any deflection of the pipe axis, the pipe required machining, the life of the pipe was usually determined by the life of the bolts which corroded at a fairly fast rate when exposed to an earthen environment, and the pipe and joint was usually difficult to assemble in the field and required the employment of skilled or at least semiskilled labor.

Subsequently, a joint of the bell and spigot type was developed and has achieved wide acceptance. In this type of construction, the pipe is cast with one cylindrical end known as the spigot and the other end with an enlarged portion called a bell. The spigot is inserted into the bell and a material is forced into the area between the spigot and the bell. The material used may be jute followed by the application of molten lead or may be a strip of lead which is pounded into the area until a seal is effected between the spigot and the bell. Although this type of joint has a reasonably long life and no machining of the pipe in the area of the seal is necessary, the joint may leak if the pipe is deflected.

A modification of the bell and spigot construction is a type of mechanical joint wherein a flange is cast on the end of the bell. A collar or gland is then bolted to the flange which holds the sealing member, such as a gasket, against the spigot so as to effect the seal. Since bolts are employed to hold the sections of pipe together, a pipe line constructed in this fashion has a relatively short life when subjected to an earthen environment due to the rapid corrosion and deterioration of the bolts. However, no machining is required and the joint forms a good seal for all operating pressures and allows some deflection of the pipe line without affecting the seal.

The latest type of construction employs a bell and spigot wherein the seal between the bell and spigot is effected by an annular, resilient sealing member called an O-ring which is positioned either on the end of the spigot and as the spigot is inserted in the bell, the ring rolls to its proper assembly point or in an alternate construction, the ring is retained within an internal recess within the bell and due to the tapered configuration of the spigot end, the ring is compressed as the spigot is inserted to thereby form a seal. This type of joint is effective to retain high operating pressures, permits deflection of adjoining pipe sections, and has a long life which is equal to the life of the pipe when exposed to an earthen environment.

The present invention combines the desirable qualities of the foregoing types of pipe joints without incorporating the foregoing deficiencies of those joints by providing a slip-on or roll-on type of joint which incorporates a weld bead that cooperates with a flange for placing the circumference of the pipe in compression which resists the internal pressure of the fluid under transmission by the pipe line.

Summary of the invention

It is a further object of the present invention to provide a pipe joint having a positive anchor for locking the joint and which incorporates means for causing the circumference of the pipe to be in a state of compression during fluid transmission therein.

It is a still further object of the present invention to provide a pipe joint of the bell and spigot type of ductile cast iron which permits deflection of the pipe members without deleterious effects to the seal therebetween and which is capable of fluid transmission at high pressures due to the provision of a selectively positioned circumferential weld bead that acts to cause the circumference of the pipe to be in a state of compression.

These and other objects of the present invention are accomplished by providing a pipe member having a bell with an integrally formed flange thereon. An elastomeric sealing member is positioned within an internal recess within the bell. A flange having a front end surface and a rear end surface is positioned over the spigot of a similar pipe member. A circumferential weld bead, either continuous or segmented, is formed about the periphery of the spigot at a distance less than the length of spigot inserted into the bell. After the spigot is inserted within the elastomeric sealing member positioned in the bell, bolt means are employed for joining the flange of the bell with the flange of the spigot.

As the internal pressure of the pipe joint increases and the bolts apply pressure to the holding flanges, an inward component of force against the weld bead is generated which increases as the internal pressure increases. This action tends to counteract the tendency of the internal pressure to rupture the pipe at this point of connection and actually places the circumference of the pipe in compression. This force resists the internal pressure of the fluid inside the pipe. The loose ductile flange can be rotated on the spigot of the pipe member so that the bolts joining the flanges are easily positioned after the pipe is in position, usually in a trench or ditch. The circumferential weld bead does not have to be continuous to perform its functions of holding the joint together and resisting internal pressure. If lower pressures are employed, segments of the weld can be utilized to advantage. The cost of welding the bead on the spigot is proportional to the amount of the weld bead placed on the pipe.

The invention both as to its organization and method of operation together with further objects and advantages thereof will best be understood by reference to the following specification taken in conjunction with the accompanying drawings, in which:

FIGURE 1 is an exploded perspective view with parts broken away in the bell to show the bell recess which receives the annular resilient sealing member;

FIGURE 2 is a vertical sectional view taken along the line 2—2 of the FIGURE 1 and illustrating the position of the circumferential weld bead and flange prior to assembly;

FIGURE 3 is an elevational view of the two pipe members in their joined configuration with parts broken away and shown in section;

FIGURE 4 is a vertical sectional view taken along the line 4—4 of the FIGURE 3 and showing the circumferential nature of the weld bead;

FIGURE 5 is a perspective view of another embodiment of the invention and illustrating the invention as practiced with a circumferential bead which is in segments;

FIGURE 6 is a vertical sectional view taken along the line 6—6 of the FIGURE 5 and illustrating the relative positions of the segmented beads;

FIGURE 7 is a perspective view of another embodiment of the invention wherein the flange about the spigot is welded to the periphery of the spigot by a weld; and FIGURE 8 is an elevational view of the two pipe members, the spigot being shown in the FIGURE 7, in their joined configuration with parts broken away and shown in section.

The FIGURES 1, 2, 3 and 4 illustrate a preferred embodiment of the invention wherein the spigot flange is loose about the spigot and a circumferential bead is continuous about the periphery of the spigot. The FIGURES 5 and 6 illustrate a second embodiment of the invention which is similar to that of the foregoing figures except that the weld bead, rather than being continuous, is segmented or in segments. The FIGURES 7 and 8 illustrate a still further embodiment of the invention wherein the front end surface of the spigot flange is welded to the flange, the rear end surface of the spigot flange being unsecured to the spigot.

With reference to the FIGURE 1, a spigot 10 having a tapered external leading surface 12 has positioned thereover a collar 14. A plurality of axially positioned apertures 16 are formed in the collar for receiving a plurality of securing members, such as a bolt and nut, to be hereinafter described, for locking the spigot to the bell, the bell to be hereinafter described.

As best illustrated in the FIGURE 2, the collar 14 includes a substantially flat rear end surface 18 and an annular boss 20 forming the front end surface of the collar 14 and integrally joined thereto. A circumferential bead 22 is formed about the periphery of the spigot 10 and may be formed by any convenient means, such as by welding.

With reference again to the FIGURE 1, a bell 24 is integrally joined to a spigot 26 and has a flange 28 formed about the bell 24. A plurality of axial aligned apertures 30 are formed in the flange 28 and so positioned as to be aligned with the apertures 16 of the collar 14 during assembly. A recess 32 is formed about the inner surface of the bell 24 and adapted to receive an elastomeric annular sealing member 34. The sealing member 34 may be of rubber or of any other suitable material which is resilient and will effect a high pressure seal between the spigot 10 and the bell 24.

The FIGURE 3 is an elevational view of the spigot 10 and the bell 24 in their joined configuration with parts broken away and shown in section. More specifically, the spigot 10 is inserted into the bell 24 and in engagement with the sealing member 34, the tapered surface 12 being adjacent to but spaced away from a shoulder 36 formed internally of the bell 24. The bead 22 engages a front end surface 38 of the flange 28 and the boss 20 of the collar 14. The joint is maintained in the position shown in the FIGURE 3 by a bolt 40 having a nut 42 which is positioned in each of the apertures 30 of the flange 28 and in each of the apertures 16 of the collar 14. The bolts 40 may be of the "T-type" construction so that the T of the bolt engages the periphery of the bell 24 and the nuts 42 engage the front end surface 38 of the collar 14.

It is readily evident from the FIGURE 3 that the sealing member 34 provides an effective seal between the spigot 10 and the bell 24. In addition, the collar 14, the flange 28, the bolts 40 and the nuts 42 serve to retain the bell 10 and the spigot 24 in the position shown with the bead 22 being tightly positioned between the boss 20 of the collar 14 and the front end surface 38 of the flange 28. Thus, the joint is tightly locked in position. As internal pressure is applied inside the spigots 10 and 26, a force is generated which tends to retract the spigot 10 from its seated position within the bell 24. However, this force is resisted by the pipe coupling and as the internal pressure builds up and the bolts 40 apply pressure to the joint, an inward component of force against the weld bead 22 is generated which increases as the internal pressure within the spigots 10 and 26 increases. That is to say, the internal pressure causes the boss 20 to exert a force against the bead 22 so as to place the circumference of the spigot 10 in compression. This force tends to counteract the tendency of the internal pressure of the pipe to rupture the pipe at this connection point.

The FIGURE 4 is a vertical sectional view taken along the line 4—4 of the FIGURE 3 and illustrates the weld bead 22 and its position with respect to the flange 14. The figure clearly illustrates that the compressional force would be exerted circumferentially by the bead 22 against the spigot 10.

The FIGURES 5 and 6 illustrate a further embodiment of the invention wherein instead of a continuous circumferential bead of the earlier figures, a bead having a plurality of bead segments 44, 46 and 48 is illustrated. In the figures, identical numerals will be employed to identify identical parts or elements previously set forth with reference to the figures. Accordingly, the bead segments 44, 46 and 48 are formed on the surface of the collar 10, the collar 10 having the tapered leading external surface 12 which facilitates the assembly of the spigot 10 into the sealing member 34. The collar 14 is positioned about the spigot 10 and includes a boss 20 formed on the front end surface of the collar 14 and a plurality of axially aligned apertures 16 which function in a manner previously set forth.

The FIGURE 6 illustrates the position of three bead segments 44, 46 and 48; however, it will be readily understood by those skilled in the art that the number of bead segments may be greater or lesser than the three bead segments illustrated and that three has been selected for the purposes of setting forth an example. Further, the circumferential position of the bead segments may vary and may be equally spaced, as shown, or unequally spaced according to one's needs or what is found to be desirable. If lower pressures are employed the use of bead segments rather than a continuous bead can be utilized to advantage since the cost of welding the bead on the periphery of the spigot 10 is proportional to the amount of the weld bead placed on the spigot 10. That is to say, at lower pressures, segments or sectionalized beads could be successfully employed whereas when working with higher pressures, more or perhaps all of the circumference of the spigot would be formed with a weld bead.

The FIGURES 7 and 8 illustrate a further embodiment of the invention wherein the collar 14 is joined to the periphery of the spigot 10 by a weld bead 50. As shown in the assembled view of the FIGURE 8, the collar 14 has its front end surface joined to the spigot 10 by the weld bead 50 and with the spigot 10 positioned within the bell 24 in the manner set forth wherein a small space exists between the end of the spigot 10 and the shoulder 36 internally of the bell 24, the nuts 42 would be tightened sufficiently against the rear end surfaces 18 of the collar 14 so that the weld bead 50 is spaced from the front end surface 38 of the flange 28. As pressure is applied within the pipe members, the forces exerted tend to urge the spigots 10 and 24 away from each other but due to the reaction of the connecting bolts and their associated elements, this movement is resisted so that a turning moment exists which would be clockwise about the collar 14 with the area at or near the weld bead 50 serving as the pivot. In effect, this force serves to place the circumference of the spigot 10 in compression.

Thus, there has been described a novel pipe joint or coupling which is capable of withstanding the force of fluid under high pressures without rupture or fracture. An effective high pressure seal is maintained through the employment of an elastomeric annular sealing member which surrounds the periphery of the spigot and is seated within an internal recess within the bell of the coupling. Further, adjacent pipe sections may be deflected from a straight axial path without causing the joint to leak.

A salient feature of the invention that is in addition to acting as a positive anchor for locking the pipe joint, the weld bead formed about the periphery of the spigot places the circumference of the pipe in compression. This force resists the internal pressure of the fluid inside the pipe. As the internal pressure builds up and the coupling bolts apply pressure to the holding flanges, an inward component of force against the weld bead is generated which increases as the internal pressure increases. This tends to counteract the tendency of the internal pressure to rupture the pipe at this connection point.

Further, all of the pipe elements may be fabricated from the same material, examples being steel, cast iron, ductile cast iron, etc. For a more detailed explanation concerning ductile cast iron, reference may be had to the Millis et al. Patent No. 2,485,760.

The pipe joint is easily assembled in the field by unskilled personnel so that installation costs may be maintained at a minimum. Although three embodiments are set forth, it will be readily understood by those skilled in the art that the circumferential bead may be formed upon the periphery of the spigot by other means such as by integrally casting the bead along with the spigot.

Thus, the present invention may be embodied in other specific forms without departing from the spirit and the essential characteristics of the invention. The present embodiment is, therefore, to be considered in all respects as illustrative, and all changes which come within the meaning and range of equivalency are, therefore, intended to be embraced therein.

What is claimed is:

1. A pipe joint comprising a spigot having an end portion telescopically received within a bell in a manner providing relative deflection therebetween, a seal between the spigot end portion and the bell, means integral with said spigot and carried thereby for limiting the extent of insertion of said end portion into said bell, a first side of said limiting means being in contact with said bell, an opposite second side of said limiting means being in contact with a coupling element carried by said spigot end portion, and means connecting said coupling element to said bell for maintaining the bell in contact with said limiting means whereby a downward component of forces created by internal pressure tending to axially separate the bell and spigot automatically act through said limiting means to counteract increases in internal pressure.

2. The pipe joint as defined in claim 1 wherein said limiting means is a radially outwardly directed projection.

3. The pipe joint as defined in claim 1 wherein said limiting means is a plurality of circumferentially spaced radially outwardly directed projections.

4. The pipe joint as defined in claim 1 wherein said spigot is constructed from ductile cast iron, and said limiting means is a radially outwardly directed weld bead.

5. The pipe joint as defined in claim 1 wherein said spigot end portion has a terminal face, and said limiting means further functions to maintain said terminal face spaced from an inner surface of said bell.

6. The pipe joint as defined in claim 1 wherein said limiting means is a weld fixedly securing said coupling element to said spigot.

7. The pipe joint as defined in claim 1 wherein said coupling element is an annular flange.

8. The pipe joint as defined in claim 1 wherein said coupling element is an annular flange axially slidable and rotatable relative to said spigot.

9. The pipe joint as defined in claim 8 including axially aligned apertures in said flange and said bell in part defining said connecting means, and bolts received in said apertures.

10. The pipe joint as defined in claim 9 wherein said limiting means is a radially outwardly directed projection.

References Cited

UNITED STATES PATENTS

| | | | |
|---|---|---|---|
| 841,881 | 1/1907 | Montie | 285—342 |
| 1,939,936 | 12/1933 | Walker et al. | 285—412 |
| 2,684,860 | 7/1954 | Rafferty | 285—376 |
| 3,219,364 | 11/1965 | Wooldridge | 285—376 |
| 3,273,919 | 9/1966 | Billeter et al. | 285—374 |

CARL W. TOMLIN, *Primary Examiner.*

W. L. SHEDD, *Assistant Examiner.*

U.S. Cl. X.R.

285—414, 416